United States Patent [19]

Keith

[11] Patent Number: 4,752,792

[45] Date of Patent: Jun. 21, 1988

[54] CAMERA SUPPORT AND ACCESSORY STORAGE APPARATUS STORAGRIP

[76] Inventor: Carl D. Keith, 1305 Marengo St., New Orleans, La. 70115

[21] Appl. No.: 934,998

[22] Filed: Nov. 26, 1986

[51] Int. Cl.[4] .................. G03B 29/00; G03B 17/02
[52] U.S. Cl. ........................... 354/82; 354/288; 354/293
[58] Field of Search ............ 354/288, 295, 293, 81, 354/82, 75, 76, 202

[56] References Cited

U.S. PATENT DOCUMENTS

| | | | |
|---|---|---|---|
| 1,647,551 | 11/1927 | St. Lawrence | 354/75 X |
| 1,749,523 | 3/1930 | Willson | 354/202 |
| 2,498,137 | 2/1950 | Ryder | 354/293 |
| 2,714,844 | 8/1955 | Heidecke | 354/82 |
| 2,961,937 | 11/1960 | Karpf | 354/82 |
| 3,286,212 | 11/1966 | Thompson et al. | 354/293 X |
| 3,858,228 | 12/1974 | Mito | 354/293 |
| 4,232,958 | 11/1980 | Fukahori et al. | 354/288 X |

FOREIGN PATENT DOCUMENTS 2812917 10/1978 Fed. Rep. of Germany ...... 354/288

*Primary Examiner*—Donald A. Griffin
*Attorney, Agent, or Firm*—Pravel, Gambrell, Hewitt, Kimball & Krieger

[57] ABSTRACT

The present invention would provide a support for a camera, including a base portion for attaching the camera thereto, the base portion having upright vertically deposed handle member which would be positioned adjacent the wall of the camera, the vertical member shaped in such a manner so as to conform to a hand grip, with a strap extending over ones hand from the top of the vertical member to the corner of the base portion. The base portion would include a padded mounting area, an owner I.D. plate, and a primary storage area having a gasket sealed rearwardly hinged door, so that the storage area may provide space for additional rolls of film, filters, lens cap, or the like materials. There would be included secondary storage areas for the storage of a felt tip pen marker, lens cleaning fluid, and yet an additional secondary storage area containing a spare camera battery. In addition, there may be included a film indicator window, and a storage area for a lens cleaning cloth. The base would also accommodate a tripod attachment screw hole, a flash bracket attaches crew hole with stability channels, while further including a cable release button which would further include a release cable for allowing one to activate the camera through the release button atop the vertical handle portion to override the camera shutter release button.

9 Claims, 4 Drawing Sheets

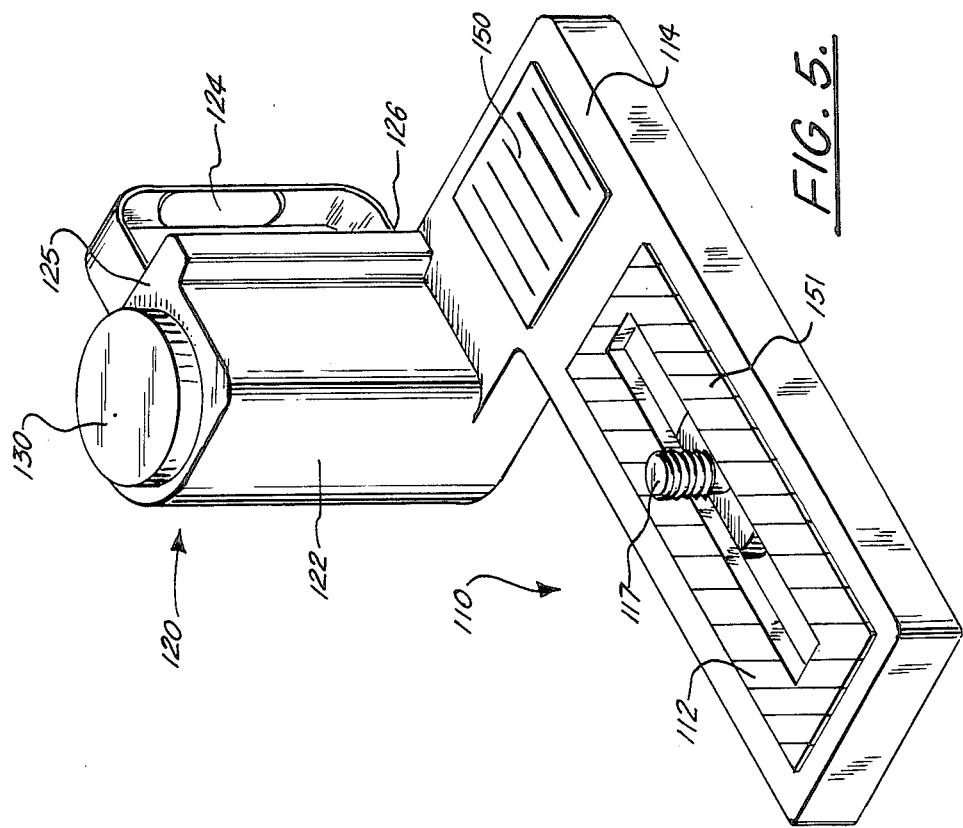
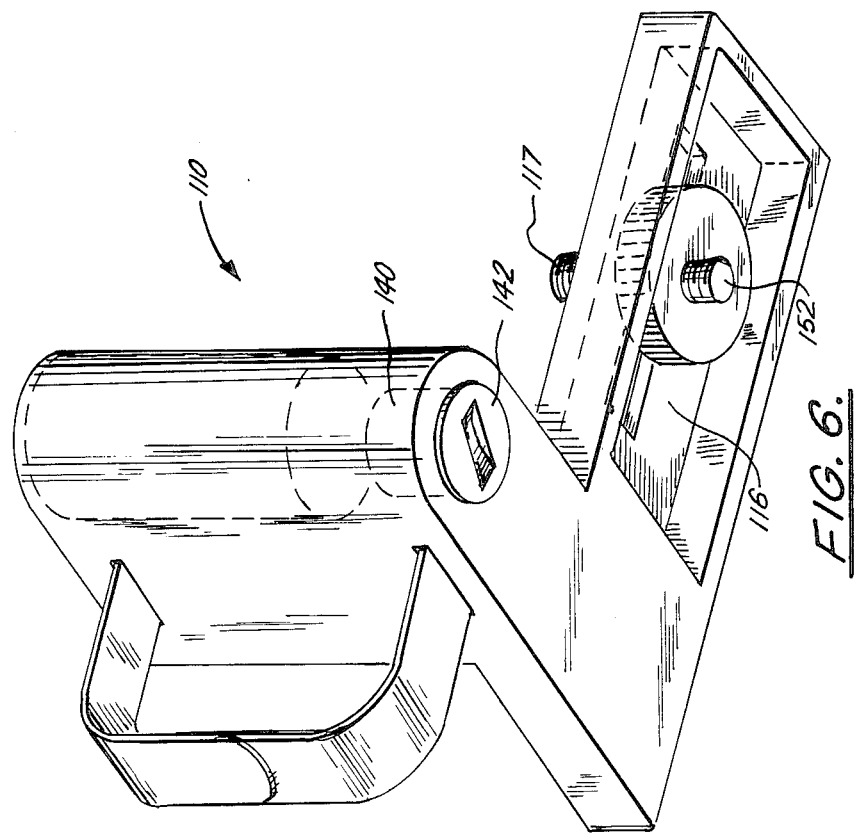

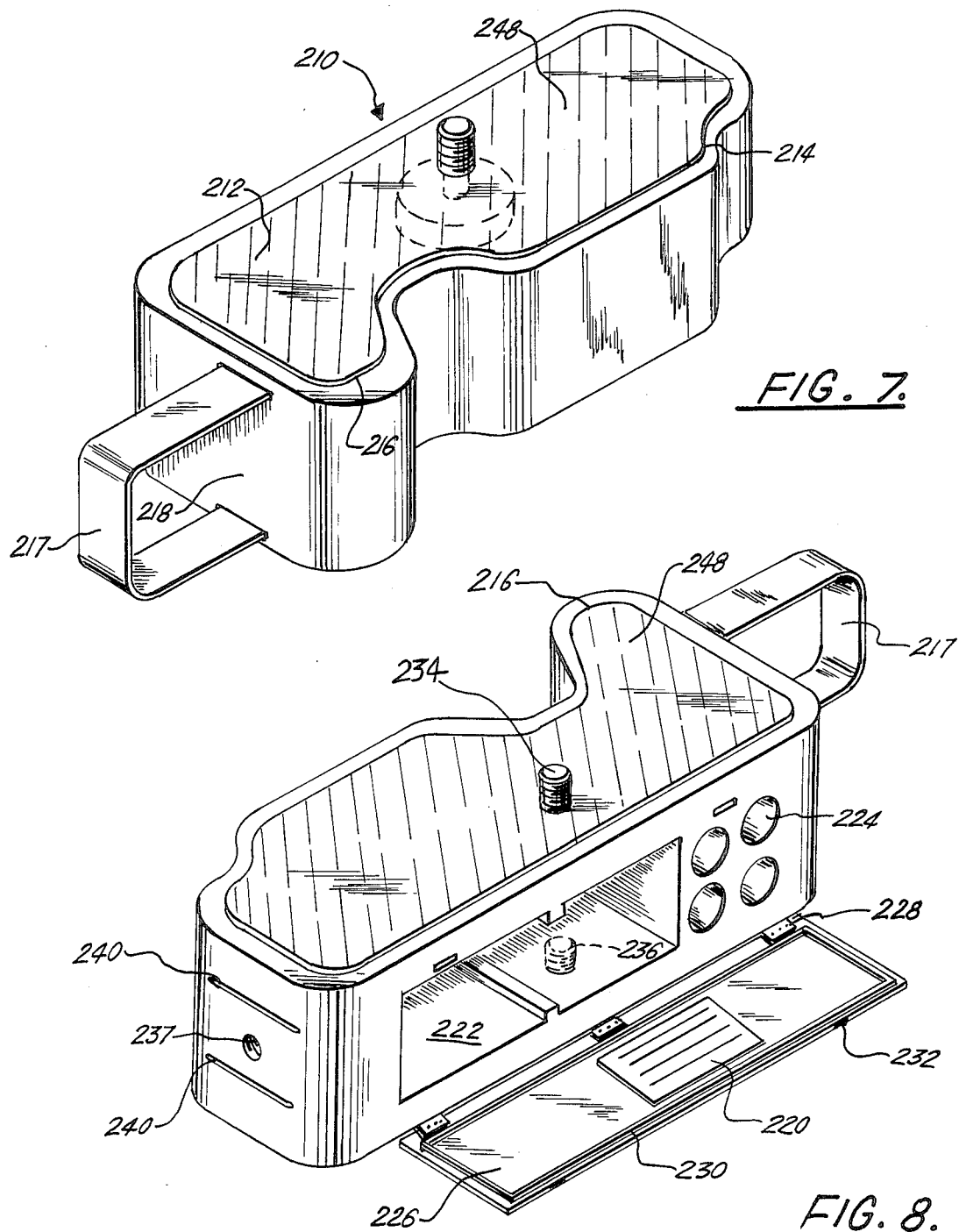

CAMERA SUPPORT AND ACCESSORY STORAGE APPARATUS STORAGRIP

BACKGROUND OF THE INVENTION

1. Field of the Invention

The apparatus of the present invention relates to camera technology. More particularly, the present invention relates to an apparatus which is designed to support a camera and to provide a means to grip the camera with ease in addition to storage of photography related items.

2. General Background

In the camera art, it is well known that cameras, more specifically 35 mm single lens reflex cameras or SLRs, have numerous accessories such as a variety of film, lens caps, lens hoods, filters, batteries, etc., which at this time, for the most part, must be carried separately by the photographer in order for the photographer to have command over the function of his camera and his photographic environment. It would therefore be beneficial to have means by which such materials could be easily assessable to the user of a camera aside from having to retrieve them from a pocket, purse, or camera bag, etc.

An additional concern with the users of 35 mm SLR cameras, for example, in the fact that such cameras, is most instances, do not provide a comfortable, secure, and proper grip so that the camera may be held without gripping the camera on the main body portion. Gripping the camera on the main body portion often times may result in improper movement of the camera, placing the fingers or the like over sensitive areas, or worse, losing your grip and dropping the camera. Camera owners lack the means for a secure grip that provides them with sense of confidence and storage capacity in handling and using their photographic investment.

Therefore, a solution to these problems which plague the art may be found in a single apparatus, as with the present invention, whereby the problem of storage of materials which are related to photography and the problem of overcoming the need for a grip may be solved in a straightforward and easy manner.

There have been recorded patents in the U.S. Patent and Trademark Office which may be related to the present invention, the most pertinent being as follows:

| U.S. PAT. NO. | INVENTOR: | TITLE: |
| --- | --- | --- |
| 4,097,883 | Adamski, et al | "Camera Grip" |
| 3,938,166 | Sloop | "Camera Side Strap" |
| 4,530,584 | Schmidt | "Camera Support" |
| 4,405,223 | Shull | "Pistol Grip" |
| 2,949,838 | Skalabrin | "Camera Grip For Miniature" |
| 4,545,660 | Rudolf | Camera Holder With Retractable Bipod Support" |
| 4,329,041 | Madge, et al | "Camera Hand Grip" |
| 4,319,825 | Newton | "Camera And Flash Unit Support" |

SUMMARY OF THE PRESENT INVENTION

The apparatus of the present invention FIGS. 1 and 4, would provide a support for a camera, including a base portion for attaching the camera thereto, the base portion having upright vertically deposed handle member which would be positioned adjacent the front wall of the camera. The vertical member would be shaped in such a manner so as to conform to a columnar hand grip with a sealable storage chamber for a roll of film, and an adjustable yet removable hand strap that when used would extend over one's hand from the top of the vertical member to the lower corner of the base portion. The base portion of the vertical member would include a separately sealed spare camera battery storage space, as well as primary and secondary storage areas closed by a rearwardly hinged door, that would provide space for film, lens caps, filters, lens cleaning fluid, and or additional photographic accessories. The base would further accommodate a tripod attachment screw hole, a film type indicator, an owner identification plate, a flash bracket accessory attachment screw socket with stability slots, a padded camera mount area, and a cable release which would allow the photographer to activate the camera portion which would override the regular camera shutter release button. Two additional embodiments are included to illustrate possible design variations that may be derived from the principal embodiment. These additional embodiment design differences are based upon the needs of the less demanding 35 mm SLR user, and as a result of 35 mm SLR camera design. The first additional embodiment may simply include a base portion having a padded mounting means for attaching the camera thereto with a vertical handle portion, and a sealed storage space in the upper vertical handle portion for a single roll of film. The vertical member would also have a sealed storage space in the lower handle portion for a spare camera battery. It would further include an owner identification plate. It would further include an owner identification plate, and an adjustable yet removable hand strap for a more confident grip. The second additional embodiment, is particularly designed to support, for example, a specific camera like the Minolta Maxxum 7000. This second additional embodiment would have a primary and secondary storage areas covered by a rearwardly hinged door, an adjustable yet removable hand strap, a standard tripod screw a flash bracket attachment socket with stability slots, a padded camera mount, and an owner identification plate. This embodiment is suitable for the Minolta Maxxum 7000 which has a built in protruding grip. This type of camera design, with a built in gripper portion, has no need for a vertical gripping member as contained in the principal and first additional embodiments. As one can see from the additional embodiments many designs are possible, however, having some similarities or differences, all are conceived through the fundamental concepts of the present invention represented by the principal embodiment.

BRIEF DESCRIPTION OF THE DRAWINGS

FIGS. 5 and 6 illustrate a first additional embodiment of the apparatus of the present invention; and FIGS. 7 and 8 represent a second additional embodiment of apparatus of the present invention.

DETAILED DESCRIPTION OF THE PREFERRED EMBODIMENT

Figure 1:
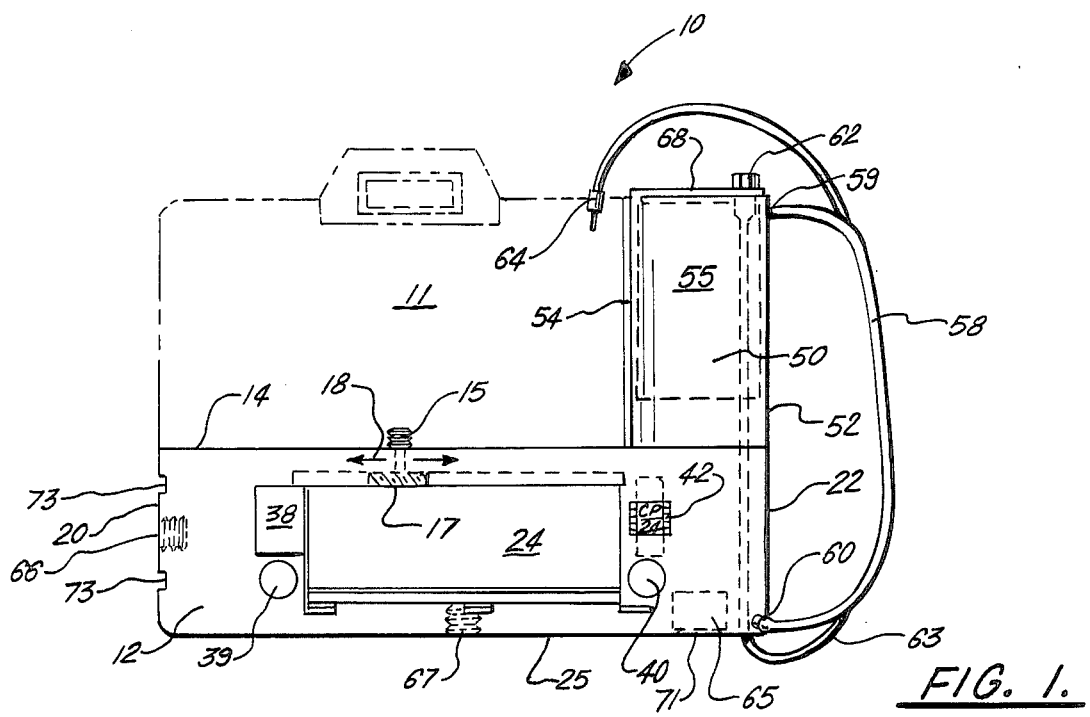
FIG. 1 is a rear view of the preferred embodiment of the apparatus of the present invention.
Figure 2:
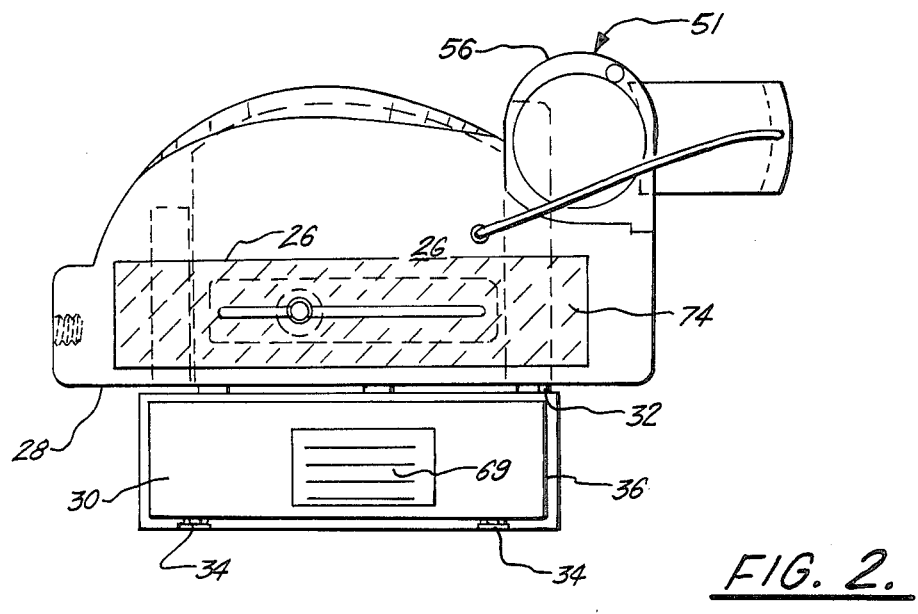
FIG. 2 is a top view of the preferred embodiment of the apparatus of the present invention.

The preferred embodiment of the apparatus of the present invention is illustrated in FIGS. 1-4 by the numeral 10. As seen in the FIGURES, apparatus 10 includes a primary base portion 12 which provides an upper surface 14 for accommodating the base of a camera, such as a standard 35 mm SLR. Surface 14 is provided with a rotatable screw member 15 which is screwable into a standard camera tripod socket, through the rotation of head 17. It should be noted that screw 15 is slidable along a distance as indicated by Arrows 18, depending on the type of camera being mounted thereupon. For purposes of illustration turning to FIG. 1, base portion 12 would be of sufficient depth along side walls 20 and 22, to provide a storage container space 24 between upper surface 14 and lower most surface 25, the function of which will be described.

Container space 24 as indicated in the FIGURES, and as seen in top view via phantom line 26, has access to via the rear portion 28 of base portion 12. As seen particularly in FIG. 2 this access is provided through a rear door member 30 being hinged to the base portion 12 via a plurality of hinges 32. The door 30 having a pair of latching means 34 and a sealing gasket 36 so that when the door is in the closed position as seen in FIG. 1, the contents are substantially sealed therewithin from moisture or the like. Also, notice on the inner face of door 30 of FIG. 2, the set in owner identification plate 69, which would provide positive identification of the owner.

For purposes of the use of the storage space 24, it is contemplated that storage space 24 shall serve primarily as a means for storing extra rolls of film and other accessories to be utilized with the camera in apparatus 10. Also, as seen particularly in FIGS. 1 and 2, base area 12, there is further provided additional secondary storage capacity, the most pertinent being storage containers 38, 39, and 40, which are utilized primarily for the storage of a lens cleaning cloth (38), a tube of lens cleaning fluid (39), and a storage space 40 for storage of a felt tip pen of the type which is utilized to make notes on rolls of film, etc., that have been used.

As seen in the rear view in FIG. 1, apparatus 10 may further include a film type indicator window 42 which would indicate, by means of an inscribed built in revolving wheel, the type of film being utilized with the camera at that time. In addition to the primary storage of base portion 12 there is further provided vertically inclined grip member 50 which is rigidly attached to the surface 14 of base member 12 substantially along its right portion, so that a continuous side wall 52 is defined on the outer most portion and an interior side wall 54 is defined with side wall 54 and base portion 14 serving to maintain camera 11 as seen in phantom view secured in position 10. After camera 11 has been secured, there is provided gripper portion 51 which would therefore serve as a means for holding the camera and the apparatus 10 securely while the picture is being taken. This means which is defined by vertical portion 50, would be of sufficient size to allow one to wrap one's fingers substantially around the front portion 56 so as to obtain a secure grip thereunto. So that there would be no danger in perhaps dropping the apparatus and camera, there is provided an adjustable yet removable hand grip security strap 58 extending from the upper most portion 59 of member 50 to the lower most base 60 of apparatus 10.

In addition, in view of the fact that camera 11 is in position with vertical member 50 interposed between one's grip and the camera, it may be necessary that the shutter release button contained on camera 11 be overridden by a more accessible shutter release button. Therefore, there is provided accessory shutter release button 62 contained within vertical member 50 having a release cable 63 extending through the body portion 50 down through the base portion 12, and up through a channel in security strap 58 and extruding out of the upper portion thereof with a mechanism 64 for inserting into camera 11 so that upon depression of accessory shutter release button 62, the actual shutter release button of camera 11 would likewise be activated for the exposure to be made.

Figure 3:
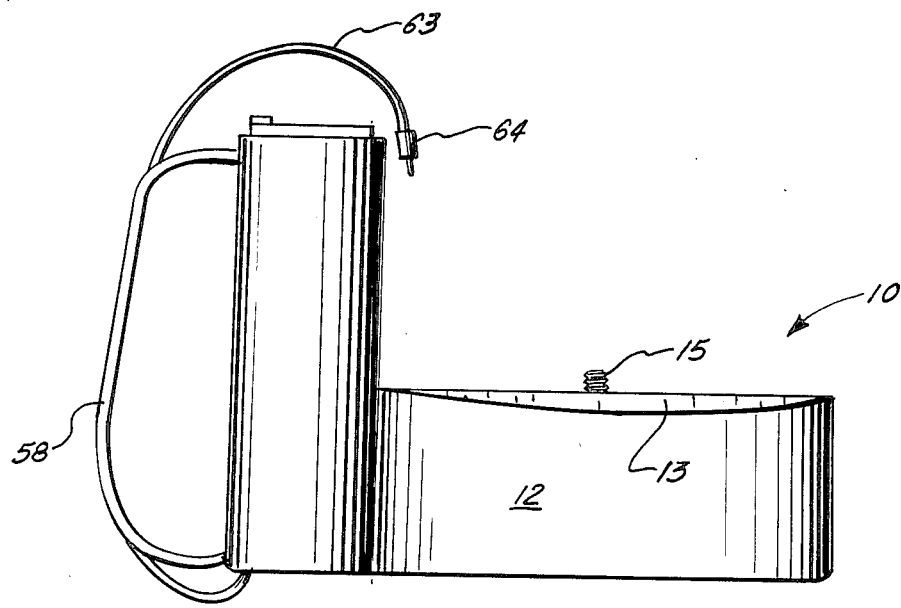
FIG. 3 is a front view of the preferred embodiment of the apparatus of the present invention.
Figure 4:
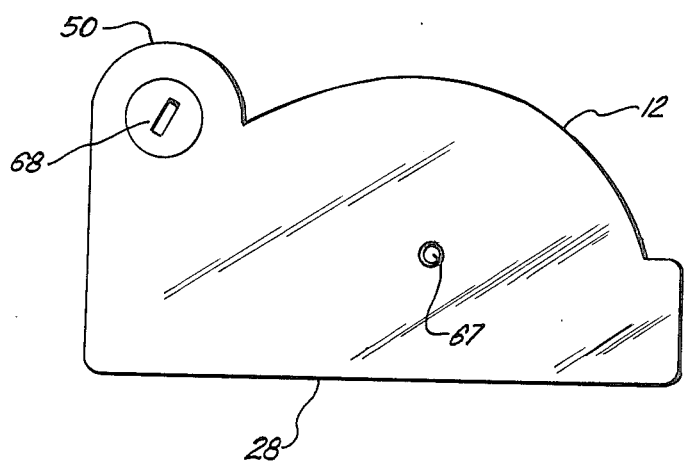
FIG. 4 is a bottom view of the preferred embodiment apparatus of the present invention.

It should be noted for purposes of design as seen in FIG. 3 that base portion 12 would have a front beveled upper portion 13 which would therefore allow any flared size lens to be accommodated onto a camera and not be blocked from being positioned on camera 11 via the front portion of base portion 12. Also included is padded area 74 on surface 14 which is provided to maintain a steady non-slipping mounting of the camera to the apparatus. For purposes of construction also, as seen in FIG. 3, member 50 could likewise be provided with a gripping portion 51 along its front side so as to provide a more stable grip of the apparatus.

For purposes of additional storage space, since vertical portion 50 for the most part is used as a grip, there would be provided additional space 55 with threaded lid 68, within the confines of grip portion 50 so as to store an additional roll of film or the like. Further there is provided a spare camera battery storage space 65 with threaded lid 71, a standard tripod attaching screw socket 67 on surface 25, and accessory flash bracket screw socket 66 on surface 20. Socket 66 would also include channels 73 for assuring proper alignment and stability of the flash bracket upon attachment.

Therefore, for purposes of use, apparatus 10 would provide a means allowing one to utilize a 35 mm camera, while carrying the necessary accessories in the base and grip storage area when secured onto camera 11, so that the apparatus in addition to functioning as a storage container, would also include a means for assisting to grip the camera more securely in positioning it for proper shooting.

In the first additional embodiment as seen in FIGS. 5 and 6, apparatus 110 in the additional embodiment, would likewise include a base portion 112 with a similar padded mounting area 151, base portion 112 serving simply as a means for attaching the base of camera 11 onto an upper surface 114 with the lower surface 116 serving to accommodate the screw member 117 which would accommodate the base of a camera mounted thereupon as with the preferred embodiment. The screw member 117 would also have threaded base 152 for attaching accessory equipment. This embodiment would likewise contain a vertical portion 120 serving as a primary storage space 122 therewithin, and having likewise an adjustable removable security handle 124 extending from the upper portion 125 to the base 126 of apparatus 110. There would further be included a threaded film chamber lid 130 like on the present embodiment, which would threadably attach to the upper portion of storage space 122 for storage of film thereinto. This particular embodiment as seen in the drawings, is a stream line version of the preferred embodiment and is unable to store the amount of items as with the principal embodiment. In addition to the primary storage space 122 there is seen an additional storage space 140 with threaded cap 142 on the lower most portion of the apparatus for storage of spare batteries for camera 111 for use with the apparatus, and an identification plate means 150 on the base surface 114 for the user to place identification thereupon.

A second additional embodiment is illustrated in FIGS. 7 and 8 by the numeral 210. For purposes of illustration, apparatus 210 is specifically a support apparatus designed for supporting the Minolta Maxxum 7000 Series camera, and as is seen from the FIGURE, is shaped on its upper base surface 212 the same shape as the camera, i.e., the portion of base 212 and 214 for housing the basic body of the camera and extruding portion 216 for housing the grip that the Minolta Maxxum 7000 camera has. The apparatus would further include again the adjustable removable security handle strap 217 on its side wall 218 and identification means 220 on the inner surface of hinged door 226, the door to be discussed further; Tag 220 would be used to place owner indicia thereupon. Further, as seen particularly in FIG. 8, the base portion 212 of apparatus 210 would include again a storage area 222 which would include an opening to cover substantially that portion 214 of base 212 for the storage of extra rolls of film or the like. Further, there would be included additional storage container portions 224 in the rear of the base portion 212 for the storage of a spare set of 4 size AAA batteries, or the like. Like the principal embodiment, apparatus 210 would also have a padded camera mounting area 240, and hinged door portion 226 mounted onto the apparatus via hinges 228 and having the border gasket sealing means 230 so that when door portion 226 is placed in the closed position, it is maintained in that position via latches 232 and seals the storage spaces 222 and 224 off from any air or moisture accumulation. In addition there would be a mounting screw 234 for mounting the Minolta camera thereupon for use; as well as standard tripod and flash bracket attachment screw holes 236 and 237, respectively. To further support a flash bracket or other accessory attachment, there are provided channels 240 to accommodate the bracket and act to stabilize it.

Therefore, in effect, although this is a simplified version of the apparatus, this particular embodiment is suitable for the particular camera noted, and would be an efficient means for providing a base with storage compartments and an exterior 216 of the camera's present grip beneath the camera yet streamline in its structure for meeting the design features of the camera once mounted thereupon.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus attachable to the exterior of a camera for camera grip enhancement while also providing storage space within the apparatus, the apparatus comprising:
   a. a base portion attached to the base of the camera;
   b. a storage chamber contained within the base portion for storing extra camera accessories to be used with the camera, the storage chamber accessible from the exterior of the base portion during use of the camera;
   c. a vertical member rigidly secured to the base portion, extending vertically along a right front wall of the camera, for allowing the user to better grip the camera during use; and
   d. a door member hingedly secured to the storage chamber extending along the rear wall of the base portion for allowing access to the accessories stored in the storage chamber without exposing inner parts of the camera to which the apparatus is attached.

2. The apparatus in claim 1, further comprising secondary storage means in the base and a vertical member for storing accessories for the camera.

3. The apparatus in claim 1, wherein the secondary storage container further includes means for storage of lens liquid cleaner and a felt tip pen marker.

4. The apparatus in claim 1, wherein there is further included film type indicator means on the base portion.

5. The apparatus in claim 1, wherein the attachment means to the camera is movable along a track on the base member for attaching various types of cameras thereinto.

6. The apparatus in claim 1, wherein there is further included an accessory attachment screw for the attachment of a flash bracket handle or the like.

7. An apparatus attached to the base of a camera, the apparatus comprising:
   a. a base portion attachable to the bottom of the camera, the base portion substantially in the configuration of the shape of a camera;
   b. at least one primary storage chamber contained within the base portion for storing spare accessory items to be used with the camera;
   c. a secondary storage chamber adjacent the primary storage chamber for storing additional accessories for the camera;
   d. a vertical member rigidly secured to a front right edge of the base portion, which extends vertically along the front wall of the camera that creates grip improvement for the user when handling the camera; and a
   e. door hingedly attached to the rear of the base portion which extends along the primary and secondary chambers for sealably securing spare camera accessories items within the interior of the primary and secondary storage chambers which are contained within the base portion attached to the camera so when opened is exposing spare accessory items and not vital interior parts currently operating inside the camera to which the apparatus is attached.

8. The apparatus in claims 6 or 7, wherein the primary storage container further includes a sealible door secured to the apparatus for preventing air or moisture or the like to seep thereinto.

9. An apparatus that is secured to the base of a camera, and also provides storage space, the apparatus comprising:
   a. a base portion selectively designed to conform to the shape of the base portion of the camera, the base portion having a raised grasping member vertically raised from the front of the base portion substantially conforming to the shape of the vertical support portion serving as a gripable extension of the camera to which it is attached;
   b. at least a single storage chamber contained within the base portion that is designed to store spare rolls of film and other accessories to be used with the camera, with secondary chamber space in the base portion used for storing batteries; and c. a door member hingedly secured to the base portion extending along the length of the base portion for allowing access to the accessories stored in the first storage chamber when the door member is in an open position and sealably storing the accessories when the door member is in a closed position.

* * * * *